(12) United States Patent
Ahlers et al.

(10) Patent No.: US 7,690,837 B2
(45) Date of Patent: Apr. 6, 2010

(54) METHOD OF ANALYSIS OF EFFECTS OF CARGO FIRE ON PRIMARY AIRCRAFT STRUCTURE TEMPERATURES

(75) Inventors: Mark F. Ahlers, Lynnwood, WA (US); Mel Eshghi, Bellevue, WA (US); Daniel F. Lewinski, Stanwood, WA (US); Richard J. Mazzone, Monroe, WA (US)

(73) Assignee: The Boeing Company, Chicago, IL (US)

( * ) Notice: Subject to any disclaimer, the term of this patent is extended or adjusted under 35 U.S.C. 154(b) by 848 days.

(21) Appl. No.: 11/370,740

(22) Filed: Mar. 7, 2006

(65) Prior Publication Data

US 2010/0004891 A1 Jan. 7, 2010

(51) Int. Cl.
 *G01K 1/12* (2006.01)
 *G01K 3/14* (2006.01)
 *G01N 25/00* (2006.01)
 *G08B 17/117* (2006.01)
(52) U.S. Cl. .......................... 374/8; 374/141; 374/135; 374/112; 340/577
(58) Field of Classification Search .............. 374/45, 374/57, 100, 109–112, 115, 135, 137, 141, 374/29, 30, 36, 8, 44, 43, 31, 4, 5; 340/870.17, 340/577, 584, 578, 511, 506, 521–522, 286.5; 250/338.1; 702/130–136; 73/35.14, 35.17, 73/118.03
See application file for complete search history.

(56) References Cited

U.S. PATENT DOCUMENTS

| | | | | |
|---|---|---|---|---|
| 4,783,592 A | * | 11/1988 | Snider et al. | ................ 250/342 |
| 5,289,275 A | * | 2/1994 | Ishii et al. | ................... 348/154 |
| 5,883,573 A | * | 3/1999 | Mazeiko et al. | ............. 340/506 |
| 5,890,549 A | * | 4/1999 | Sprehe | ......................... 175/71 |
| 6,089,326 A | * | 7/2000 | Drakin | ......................... 169/46 |
| 6,522,990 B1 | * | 2/2003 | Rains et al. | ................. 702/130 |
| 6,927,394 B2 | * | 8/2005 | Parham et al. | ......... 250/339.15 |
| 7,118,272 B2 | * | 10/2006 | Bobenhausen | ............... 374/55 |

(Continued)

OTHER PUBLICATIONS

Julius J. Gassmann, "Characteristics of Fire in Large Cargo Aircraft (Phase II)", Report No. FAA-RD-70-42, Final Report, Sep. 1970, National Aviation Facilities Experimental Center, Atlantic City, New Jersey.

(Continued)

*Primary Examiner*—Gail Verbitsky
(74) *Attorney, Agent, or Firm*—Toler Law Group

(57) ABSTRACT

Embodiments provide systems and methods for analyzing effects of cargo fire on primary aircraft structure. A thermal profile of a suppressed fire in a cargo compartment of an aircraft is developed. The thermal profile is applied to a heat transfer model of structure of an aircraft, and structural integrity of the modeled structure is analyzed. The thermal profile may be developed by introducing a fire in a physical model of a cargo compartment instrumented with temperature sensors and determining profiles of temperature versus time. A heat transfer model of aircraft structure is built, boundary conditions are input into the heat transfer model, and the model is run. When analysis of the modeled structure determined structural integrity to be insufficient to satisfy flight certification requirements, structural parameters are modified, the thermal profile is applied to a heat transfer model of the modified structure, and the analysis is repeated.

20 Claims, 12 Drawing Sheets

U.S. PATENT DOCUMENTS

| | | | |
|---|---|---|---|
| 7,221,260 B2 * | 5/2007 | Berezowski et al. | 340/286.05 |
| 7,286,050 B2 * | 10/2007 | Faltesek | 340/524 |
| 7,327,247 B2 * | 2/2008 | Tice | 340/511 |
| 7,456,750 B2 * | 11/2008 | Popp et al. | 340/584 |
| 2001/0038334 A1 * | 11/2001 | Magerle et al. | 340/584 |
| 2003/0230415 A1 * | 12/2003 | Wilson et al. | 169/61 |
| 2005/0183869 A1 * | 8/2005 | Lazzarini | 169/54 |
| 2007/0291817 A1 * | 12/2007 | Bradicich et al. | 374/15 |
| 2008/0105443 A1 * | 5/2008 | Molz et al. | 169/45 |
| 2008/0106437 A1 * | 5/2008 | Zhang et al. | 340/945 |
| 2008/0143539 A1 * | 6/2008 | McSheffrey et al. | 340/584 |
| 2008/0147363 A1 * | 6/2008 | Dalton et al. | 703/5 |

OTHER PUBLICATIONS

Fire Safety Engineering Group, "SMARTFIRE Future Developments", School of Computing & Mathematical Sciences, The University of Greenwhich, http://fseg.gre.ac.uk/smartfire/smartfire_future_developments.html.

* cited by examiner

METHOD OF ANALYSIS OF EFFECTS OF CARGO FIRE ON PRIMARY AIRCRAFT STRUCTURE TEMPERATURES

BACKGROUND

Current transport airplanes include cargo fire detection and suppression systems. These systems typically detect a fire by detecting smoke and then suppress detected fires by replacing oxygen in a cargo compartment with an agent, such as Halon 1301. Thus, detected cargo fires are not extinguished but instead are suppressed. That is, the suppressed fires continue to burn—but at reduced temperatures.

To that end, the Code of Federal Regulations (CFR) 25.858 (b) requires that transport category airplane cargo smoke detection systems "must be capable of detecting a fire at a temperature significantly below that at which the structural integrity of the airplane is substantially decreased". While some testing has been performed regarding cargo fire compartments, effects of a cargo fire on structural integrity of an airplane has not been investigated.

For example, Federal Aviation Agency (FAA) full scale fire testing evaluated the effectiveness of Halon 1301 replacement agents and established a Minimum Performance Standard (MPS) for any agent that could be used to replace Halon 1301 in a Class C cargo compartment. The testing identified the maximum air temperature as well as a maximum time/air temperature curve for 30 minutes. This air temperature was recorded inside the cargo compartment. The FAA full scale test article was steel lined and the test protocol used temperature detection to start the fire suppression discharge (instead of using a fire detection system of the type actually installed on airplanes with Class C cargo compartments, such as an optical smoke detector). Further, the FAA test data did not provide temperatures outside the compartment or on primary structure adjacent to the cargo compartment. In addition, the steel cargo liner in a 70 to 75 degree Fahrenheit chamber provided a cooler ambient environment for dissipating the heat from a cargo fire than would occur for a worst-case airplane flight from an extreme hot day environment.

Mathematical simulations, such as computational fluid dynamics (CFD) models, can be used to analyze adjacent structure or objects. However, predicted data from these mathematical models has not been correlated to data from actual fires. Therefore, aircraft designers would have to rely on many assumptions regarding effects of heat from a cargo fire in performing thermal analysis. Without validation of the assumptions, aircraft designs are conservative to err on the side of safety of flight. This approach can result in overweight design solutions and added cost in order to protect the airplane structure from the effects of a suppressed cargo fire.

Moreover, without validated assumptions, CFD simulations of a cargo fire and the subsequent heating of the adjacent structure can be prone to errors. Analytical simulations of fires can be performed using CFD codes, such as Fire Dynamic Simulator (FDS) developed by the National Institute of Standards and Testing (NIST). The FDS code was developed to model the physics of fire, which includes the heat release rate and combustion by-products for a fire based on a defined burn rate and fuel source. However, the FDS code is not specifically designed to model the thermal impact of a fire on adjacent structure. FDS conduction heat transfer capabilities are limited to one-dimensional rectangular surfaces, while an airplane structure contains many complex curvilinear surfaces. In addition, it is difficult to determine an accurate fuel burn rate versus cargo compartment location for use in a cargo fire modeled with the FDS code. This difficulty is due to complex air flow patterns, fuel variability, and effects of fire suppressant agents on the burn process and subsequent combustion product generation.

It would therefore be desirable to correlate a signature used for detecting a fire in an airplane cargo compartment to the fire's threat to structural integrity of the airplane, due to high temperatures, after the airplane's-fire suppression system has been discharged.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In a non-limiting embodiment, a thermal profile of a suppressed fire in a cargo compartment of an aircraft is developed. The thermal profile is applied to a heat transfer model of structure of an aircraft, and structural integrity of the modeled structure is analyzed.

According to an aspect, the thermal profile is developed by defining a fire heat signature and processing the fire heat signature. The fire heat signature is defined by building a physical model of the cargo compartment and instrumenting the physical model of the cargo compartment with temperature sensors. The physical model of the cargo compartment is loaded with cargo loads and a fire is introduced in the physical model of the cargo compartment. The fire is suppressed and temperatures are measured by the temperature sensors. Processing the fire heat signature determines temperature profiles of temperature versus time for the temperature sensors. Processing the temperature sensor data for the structure surrounding the cargo compartment validates the mathematical simulation (computational model) for determining the resultant temperature of surrounding structure. The result is a high fidelity, computational correlation of the temperatures from a controlled cargo fire to structure surrounding a cargo compartment.

According to another aspect, applying the thermal profile includes determining boundary locations and boundary conditions. The controlled cargo fire thermal profile can be used in conjunction with the computational model to determine the thermal effects on any structure surrounding a cargo compartment from a controlled cargo fire. A heat transfer model of the structure surrounding the cargo compartment is built. Boundary conditions are input into the heat transfer model using one of the thermal profiles developed for controlled cargo fires, and the heat transfer model is run for the various controlled cargo fires. Analyzing structural integrity of the modeled structure includes determining whether structural integrity of the modeled structure is sufficient to satisfy flight certification requirements for the available strength at the calculated temperatures. When modeled structure is determined to be insufficient to satisfy flight certification requirements, structural parameters are modified, the thermal profile is applied to a heat transfer model of the modified structure, and the analysis is repeated.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

By way of overview, embodiments provide systems and methods for analyzing effects of cargo fire on primary aircraft structure. A thermal profile of a suppressed fire in a cargo compartment of an aircraft is developed. The thermal profile is applied to a heat transfer model of structure of an aircraft, and structural integrity of the modeled structure is analyzed. The thermal profile may be developed by introducing a fire in a physical model of a cargo compartment instrumented with temperature sensors and determining profiles of temperature versus time. A heat transfer model of aircraft structure is built, boundary conditions are input into the heat transfer model, and the model is run. When analysis of the modeled structure determined structural integrity to be insufficient to satisfy flight certification requirements, structural parameters are modified, the thermal profile is applied to a heat transfer model of the modified structure, and the analysis is repeated.

Exemplary Processing

Figure 1:
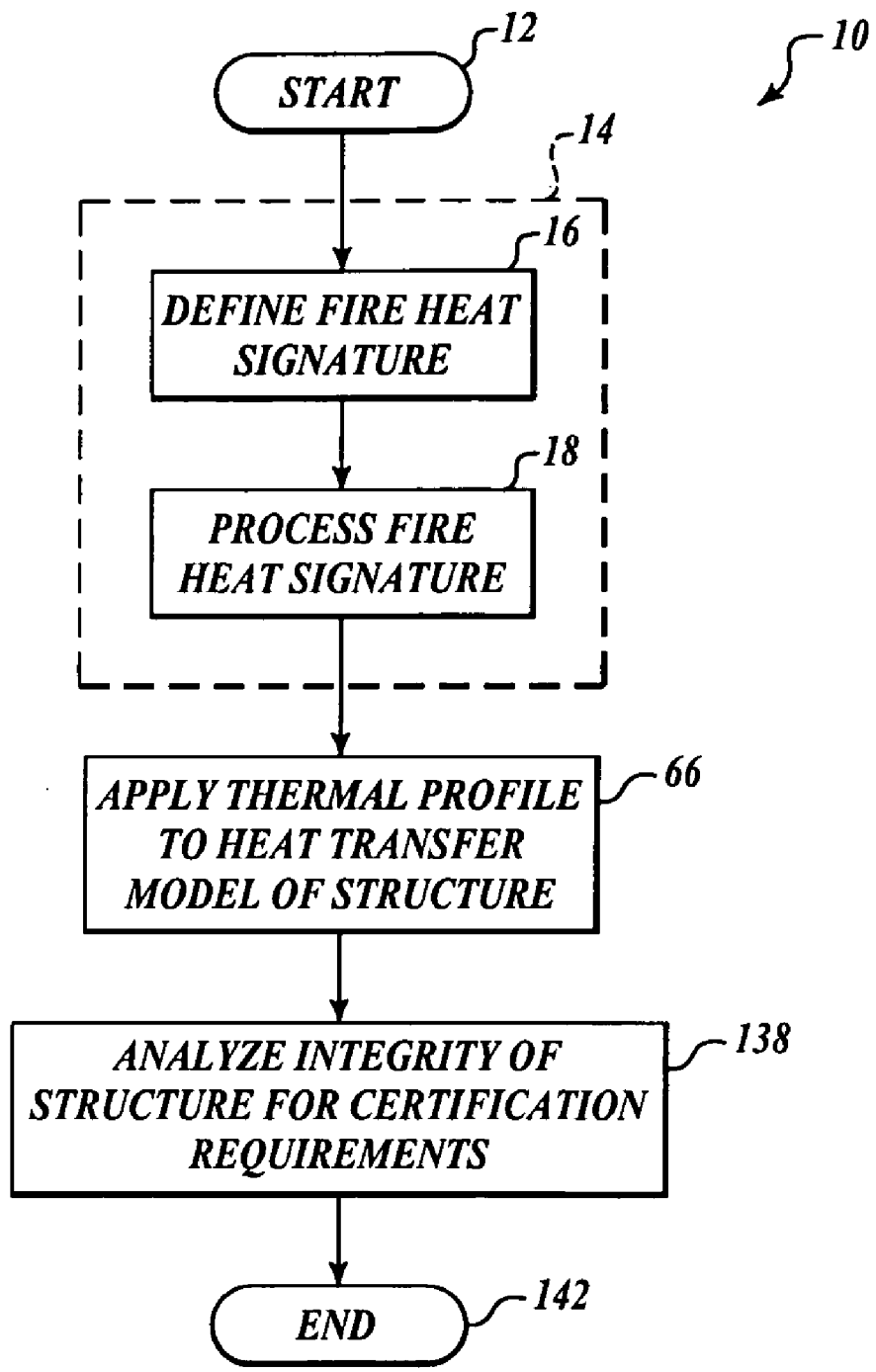
FIG. 1 is a flowchart of an exemplary method of analyzing effects of cargo fires on primary aircraft structure.

Referring now to FIG. 1, a method 10 is provided for analyzing effects of cargo fire on primary aircraft structure. The method 10 begins at a block 12. At a block 14, thermal profiles of a suppressed cargo fire are developed. The thermal profiles are profiles of temperature versus time for a suppressed fire to the ceiling, sidewalls, endwalls, and floors in an aircraft cargo compartment. The controlled cargo fire thermal profile can be used in conjunction with the computational model to determine the thermal effects on any structure surrounding a cargo compartment from a controlled cargo fire. Developing the thermal profiles at the block 14 is a one-time process that generates test data that is used for input into an analytical model. The thermal profiles may be developed at the block 14 to generate test data for different aircraft that have undergone significant changes to cargo compartment fire detection and suppression systems. Thus, the block 14 may be performed when designing or developing a new variant to an existing aircraft that incorporates significant changes to its cargo compartment fire detection and suppression system. The block 14 may also be performed when designing or developing a new aircraft whose cargo fire compartment detection and suppression system is significantly different from existing aircraft and their cargo compartment fire detection and suppression systems. Conversely, the block 14 need not be performed when designing or developing an aircraft with a cargo compartment fire detection and suppression system that is similar to a similar, existing aircraft with a similar cargo compartment fire detection and suppression system. Therefore, subsequent processing of the test data generated at the block 14 advantageously may be performed repeatedly without any need to repeat development of thermal profiles at the block 14.

Developing the thermal profiles at the block 14 includes two major processes—defining a fire heat signature at a block 16 and processing the fire heat signature at a block 18.

Figure 2:
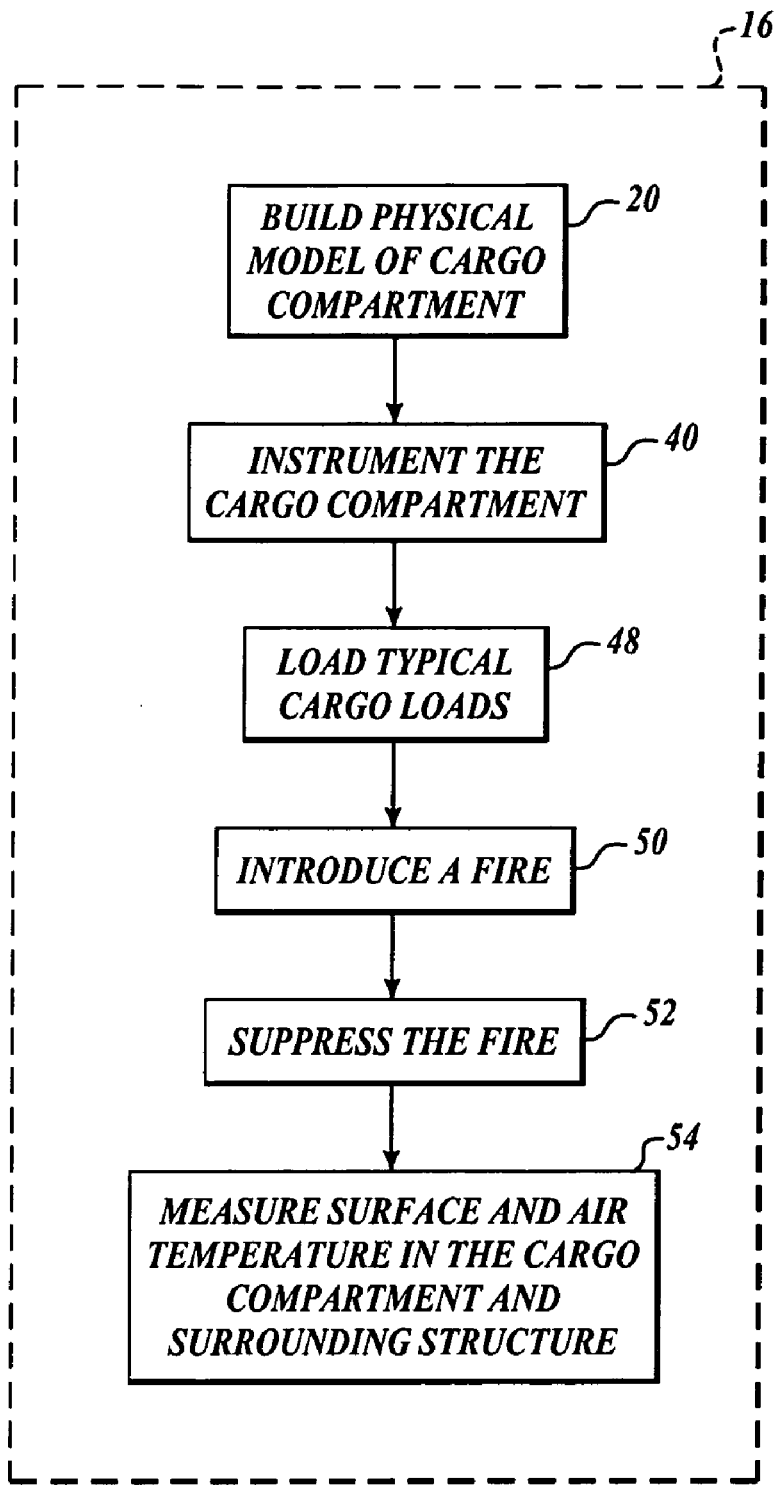
FIG. 2 is a flowchart of details of a portion of the method of FIG. 1.
Figure 3:
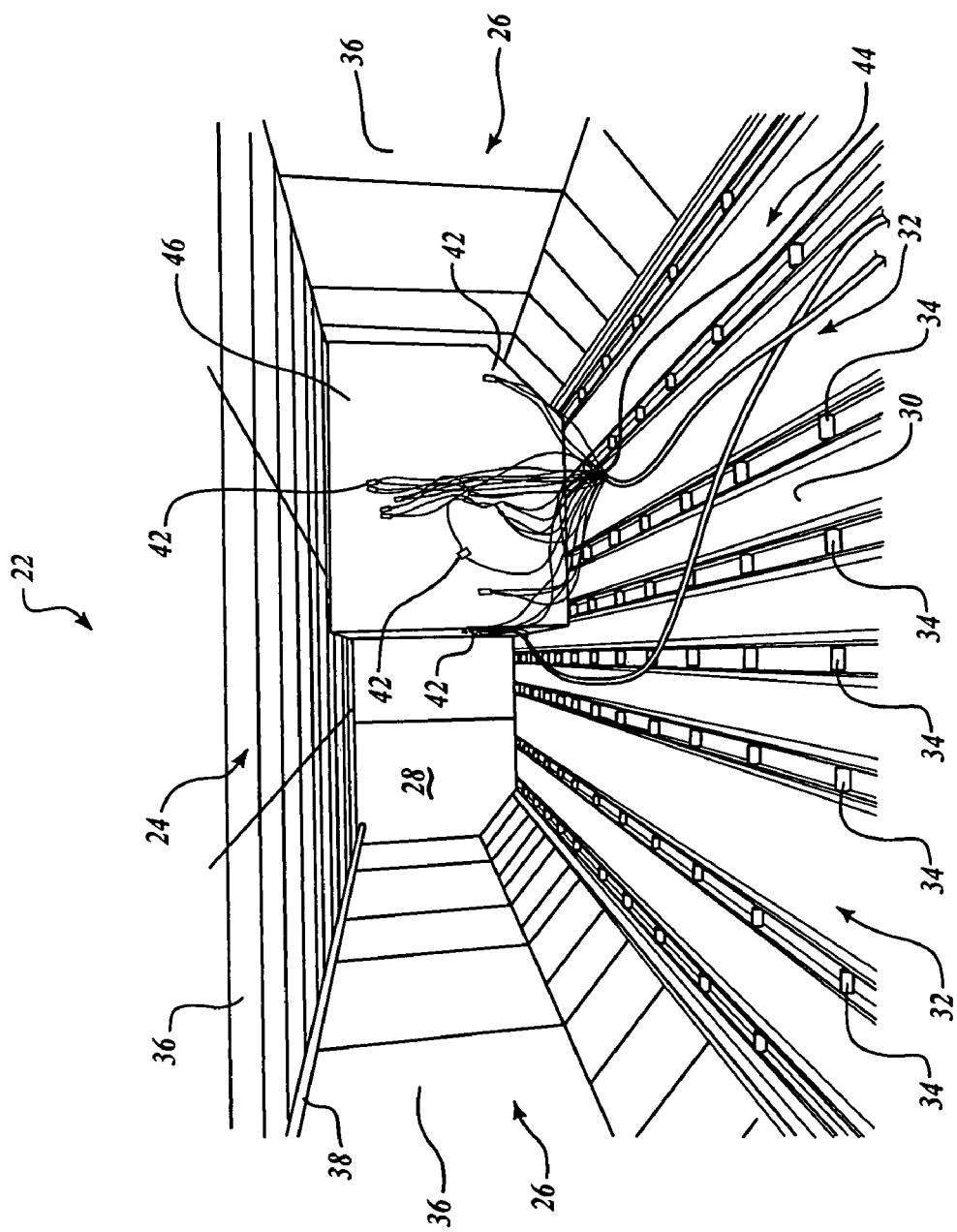
FIG. 3 is a perspective view of a physical model of an aircraft cargo compartment that is instrumented with temperature sensors.

Referring now to FIG. 2, defining the heat signature at the block 16 begins at a block 20 at which a physical model of an aircraft cargo compartment is built. If desired, the physical model of an aircraft cargo compartment may be built by modifying a lower lobe of an aircraft fuselage. Referring additionally to FIG. 3, a physical model 22 of an aircraft cargo compartment includes a ceiling 24, sidewalls 26, endwalls 28 (one of which is not shown in FIG. 3), and a floor 30. The floor 30 includes floor panels 32 that are aligned longitudinally along an axis that would coincide with that of a fuselage of an aircraft. Interspersed between each adjacent floor panel 32 is a row of rollers 34. The ceiling 24, sidewalls 26, and endwalls 28 are covered on their interior sides with cargo liners 36.

The physical model 22 includes a fire detection and suppression system. The fire detection and suppression system includes a header 38 that longitudinally traverses the length of a physical model 22 near the intersection of the ceiling 24 and one of the sidewalls 26. The header 38 is filled with a fire suppression agent, such as without limitation Halon 1301.

Further features of transport aircraft may be provided to more fully model an actual cargo compartment of transport aircraft. For example, if desired, the physical model 22 may include a passenger floor and carpeting (not shown) above the ceiling 24. Also, the physical model 22 may include an enclosure (not shown) above the passenger floor (not shown). Further, the physical model 22 may include an insulated bilge and lower lobe (not shown), including frames and stanchions, to prevent excess cooling from ambient environment. Also, if desired, the physical model 22 may include a cargo compartment ventilation system, including fans and headers (not shown).

Referring back to FIG. 2, at a block 40 the physical model 22 (FIG. 3) is instrumented. Instrumenting the physical model 22 installs temperature sensors that will be used to measure surface temperature variations of all surfaces and air adjacent to the cargo liners 36 (FIG. 3). Referring now to FIG. 3, the physical model 22 is instrumented with temperature sensors 42, such as without limitation thermocouples. The temperature sensors 42 are electrically coupled via cables 44 to processing electronics (not shown) located outside the physical model 22. The number of the temperature sensors 42 and their placement may be selected as desired for a particular application. The use of multiple temperature sensors in multiple locations provides data to account for variations in temperature with location. The use of multiple temperature sensors in multiple locations also permits instrumenting the physical model 22 to record temperatures for multiple fire scenarios. For example, in one embodiment, around 250 or so of the temperature sensors 42 were used. The temperature sensors 42 may be placed inside the physical model 22 to sense temperatures of the air around 1 in. from the cargo liners 36. The temperature sensors 42 may also be placed on surfaces of containers or pallets placed within the physical model 22 of the aircraft cargo compartment. In the non-limiting example shown in FIG. 3, the temperature sensors 42 are placed on an exterior surface of a container 46, such as without limitation an LD-3 container. Additional temperature sensors, such as thermocouples, are placed on adjacent structure outside the simulated cargo compartment to provide data to validate the analysis method.

Referring back to FIG. 2, at a block 48 typical cargo loads are loaded into the physical model 22. The cargo loads may be containerized, palletized, and/or bulk-loaded cargo. Loading the physical model 22 with more than one type of cargo permits defining a fire heat signature for multiple fire scenarios. When a pallet or a container, such as without limitation the container 46 (FIG. 3) is loaded into the physical model 22, the temperature sensors 42 may be placed on exterior surfaces of the pallet(s) or the container(s). The cargo loads provide fuel for a fire that will be subsequently introduced into the physical model 22. Given by way of non-limiting example, the fuel may include plastic, wood, fabric, foam, paper, or the like. In one exemplary application, 18 in.×18 in.×18 in. cardboard boxes were filled with around 2.5 lbs. of shredded office paper to provide fuel for the fire.

At a block 50, a fire is introduced in the physical model 22 (FIG. 3). The fuel is ignited using any known method. If desired, prior to introducing the fire the physical model 22 may be conditioned to simulate conditions inside a cargo compartment of an aircraft that has been sitting on a hot runway on a hot day. For example, the structure may be conditioned by blowing hot air, such as at temperatures of around 160 degrees Fahrenheit, from a ground cart into the cargo compartment's adjacent air volumes. Such conditioning can bring temperatures inside the physical model 22 to around 120-130° Fahrenheit or so before the fire is introduced. Also, if desired, ventilation fans (if provided) may fan the fire prior to detection of the fire.

At a block 52, the fire is suppressed. The fire detection and suppression system within the physical model 22 (FIG. 3) detects the fire in a known manner. The fire detection and suppression system then suppresses the fire in a known manner, such as by releasing an agent, such as without limitation Halon 1301. As is known, the suppression agent does not extinguish the fire. Instead, the suppression agent acts to control the fire at a reduced temperature but may not necessarily extinguish the fire.

At a block 54, surface and air temperatures are measured in the physical model 22 of the cargo compartment and surrounding structure while the suppressed fire burns. The surface and air temperatures are measured by the temperature sensors 42 (FIG. 3). Output signals from the temperature sensors 42 are indicative of temperatures. Temperature data is collected from the temperature sensors 42 over a period of time as desired for a particular application. Given by way of non-limiting example, data may be collected over a period of around two hours or so. When the temperature data stabilizes or is decreasing throughout the cargo compartment and surrounding structure, the fire is extinguished in a known manner.

This completes defining the fire heat signature at the block 16.

Figure 4:
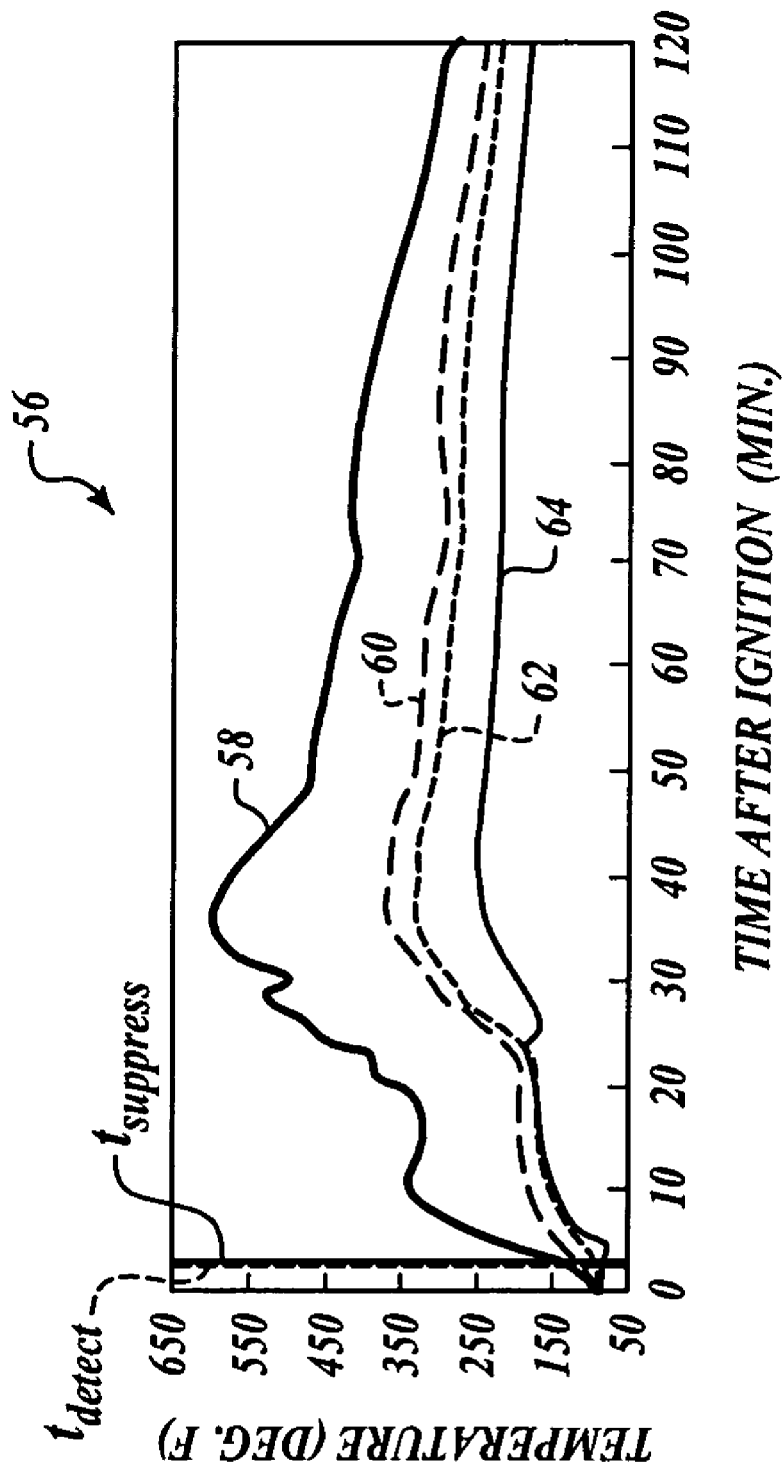
FIG. 4 is a profile of temperature versus time.

Referring back to FIG. 1, at the block 18 the fire heat signature is processed. Processing the fire heat signature at the block 18 determines profiles of temperature versus time from outputs of the temperature sensors 42 (FIG. 3). Processing the temperature sensor data for the structure surrounding the cargo compartment validates the mathematical simulation (computational model) for determining the resultant temperature of surrounding structure. The result is a high fidelity, computational correlation of the temperatures from a controlled cargo fire to structure surrounding a cargo compartment. Referring now to FIG. 4, a thermal profile 56 graphs curves 58, 60, 62, and 64 of temperature along a Y axis versus time after ignition along an X axis for outputs from several of the temperature sensors 42 (FIG. 3). Detection of the fire is indicated at a time $t_{detect}$. The suppression system activates within seconds after detection at $t_{suppress}$. Temperature profiles selected for inclusion in a thermal profile (the thermal profile being an input for subsequent processing) are based on fires with the highest energy levels. The energy level of a fire is indicated by area under the curve of temperature versus time. Multiple curves 58, 60, 62, and 64 are generated and analyzed to account for variations in temperature with location (of the fire and of the temperature sensor whose output is graphed versus time).

Referring back to FIG. 1, this completes developing the thermal profile at the block 14.

Figure 5:
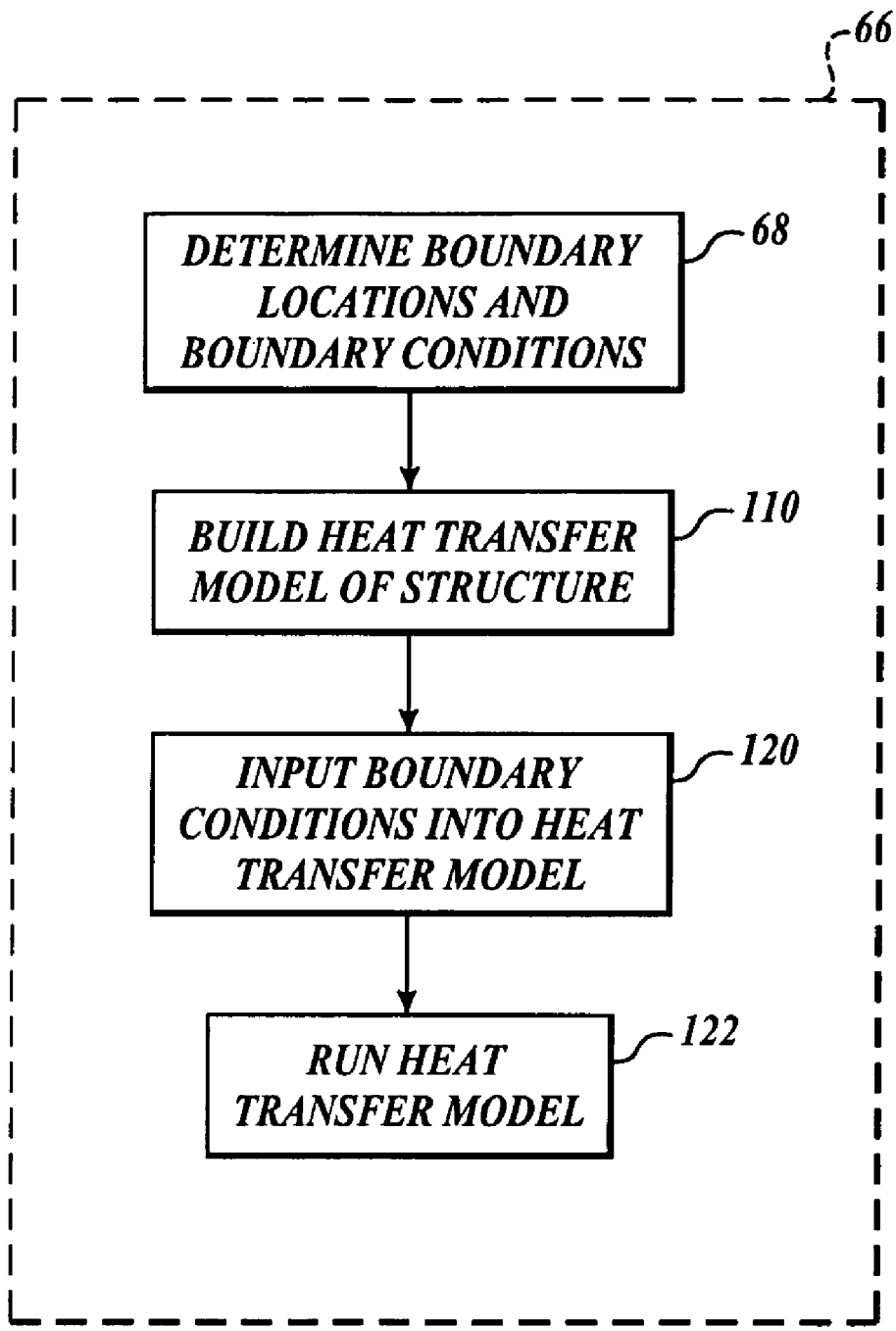
FIG. 5 is a flowchart of an exemplary method of applying a thermal profile to a heat transfer model.

At a block 66, the thermal profile is applied to a heat transfer model of aircraft structure. Advantageously, applying the thermal profile to a heat transfer model of aircraft structure predicts temperatures over time within the modeled aircraft structure. Referring now to FIG. 5, major processes within the block 66 are explained.

At a block 68, boundary locations and boundary conditions are determined. After the hottest curves are identified at the block 18 (FIG. 1), locations of the temperature sensors 42 (FIG. 3) that correspond to the hottest curves are selected as the boundary locations. Any number of boundary locations may be selected as desired for a particular application. In one exemplary, non-limiting application, around twenty locations were chosen as boundary locations.

Figure 6:
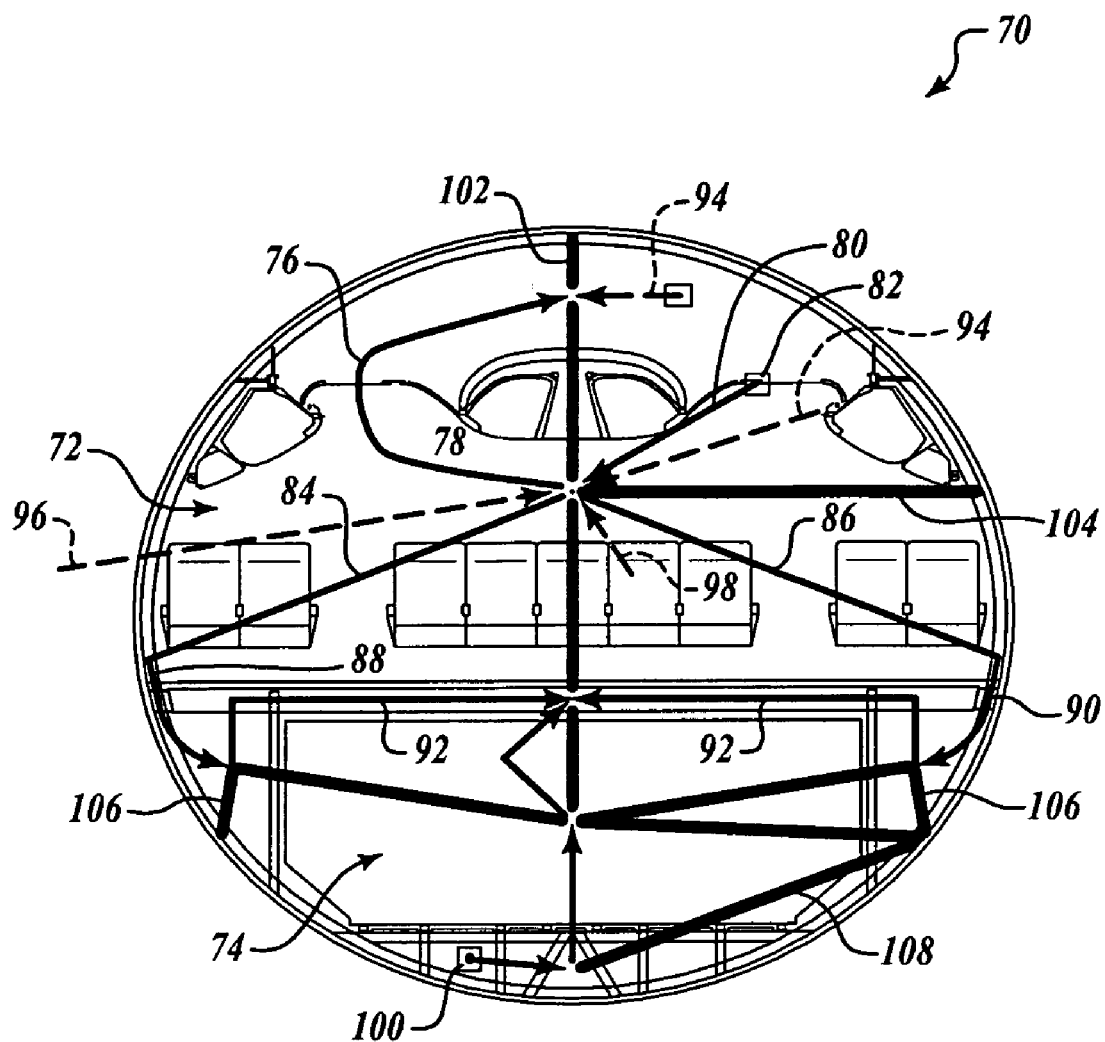
FIG. 6 illustrates exemplary air flows within a transport aircraft.

Boundary conditions are also determined at the block 68. The boundary conditions include air flows that affect the cargo compartment. The air flows that affect the cargo compartment are used as parameters in a model to determine heat transfer from a fire to a cargo liner and from the cargo liner to surrounding structure. This analysis breaks up an aircraft fuselage into air nodes and flow conductors. Referring now to FIG. 6, air flows, heat loads, and heat losses and gains that affect a cargo compartment and are illustrated. An exemplary fuselage 70 includes a passenger cabin 72 and a cargo compartment 74. An air flow 76 flows in the passenger cabin 72 through ceiling panels 78. An air flow 80 flows in the passenger cabin 72 from air conditioning nozzles 82. Return air flows 84 and 86 flow from the passenger cabin 72 through return air grills 88 and 90, respectively, on left and right sides of the fuselage, respectively, into the cargo compartment 74, and then fore and aft along the left and right sides of the cargo compartment 74. Air flows 92 flow on top of the cargo compartment 74 under floor beams of the passenger compartment 72. Heat loads in the passenger compartment 72 include electrical loads 94, solar loads 96, and passenger loads 98. Heat loads in the cargo compartment 74 include cargo heat 100. Heat losses and gains in the passenger compartment 72 include crown skin nodes 102 in the overhead crown, and sidewall skin nodes 104. Heat losses and gains in the cargo compartment 74 include lower lobe skin nodes 106 and bilge nodes 108.

The boundary conditions also include initial temperatures of air and of airplane structure before initiation of a fire. In addition, the boundary conditions also include radiation boundary temperatures, such as those for cargo container surfaces, pallet surfaces, and smoke. The initial temperatures may be determined from empirical data, if available. For example, a hot day flight may be modeled, if desired. Alternately, conditions may be used from a MIL-Handbook 310 day (that is, 130 degree Fahrenheit ground ambient air). The initial structural temperatures may also be predicted using a thermal/fluid computer flow model of the airplane. The computer model calculates the air temperatures and flowrates for air flowing adjacent to the cargo compartment as well as the temperatures of the adjacent structure.

Referring back to FIG. 5, a heat transfer model of aircraft structure is built at a block 110. The heat transfer model of aircraft structure may be built in a known manner using commercially available modeling software. For example, FLUENT, available from Aavid Thermal Technologie, is an industry-standard computational fluid dynamics (CFD) code used to predict to an airplane structural temperatures. This CFD code can simulate the details of combustion process, but its use can be time consuming. With current computing hardware capability, it may not be practical to use this code for the direct combustion simulation in a large volume. Instead, a thermal signature of a fire is simulated with boundary air and radiation temperatures. As another example, PATRAN, available from MSC Software, is a finite element model (FEM) code that is widely used to generate finite element models of aircraft structural components. As a further example, SINDA, available from Culimore Ring Technologies, is a finite difference model (FDM) code used for building a thermal model of structure. SINDA starts from cargo liners and a grid of thermal conductors and inputs thermal profiles and boundary temperatures for radiation and convection.

Figure 7:
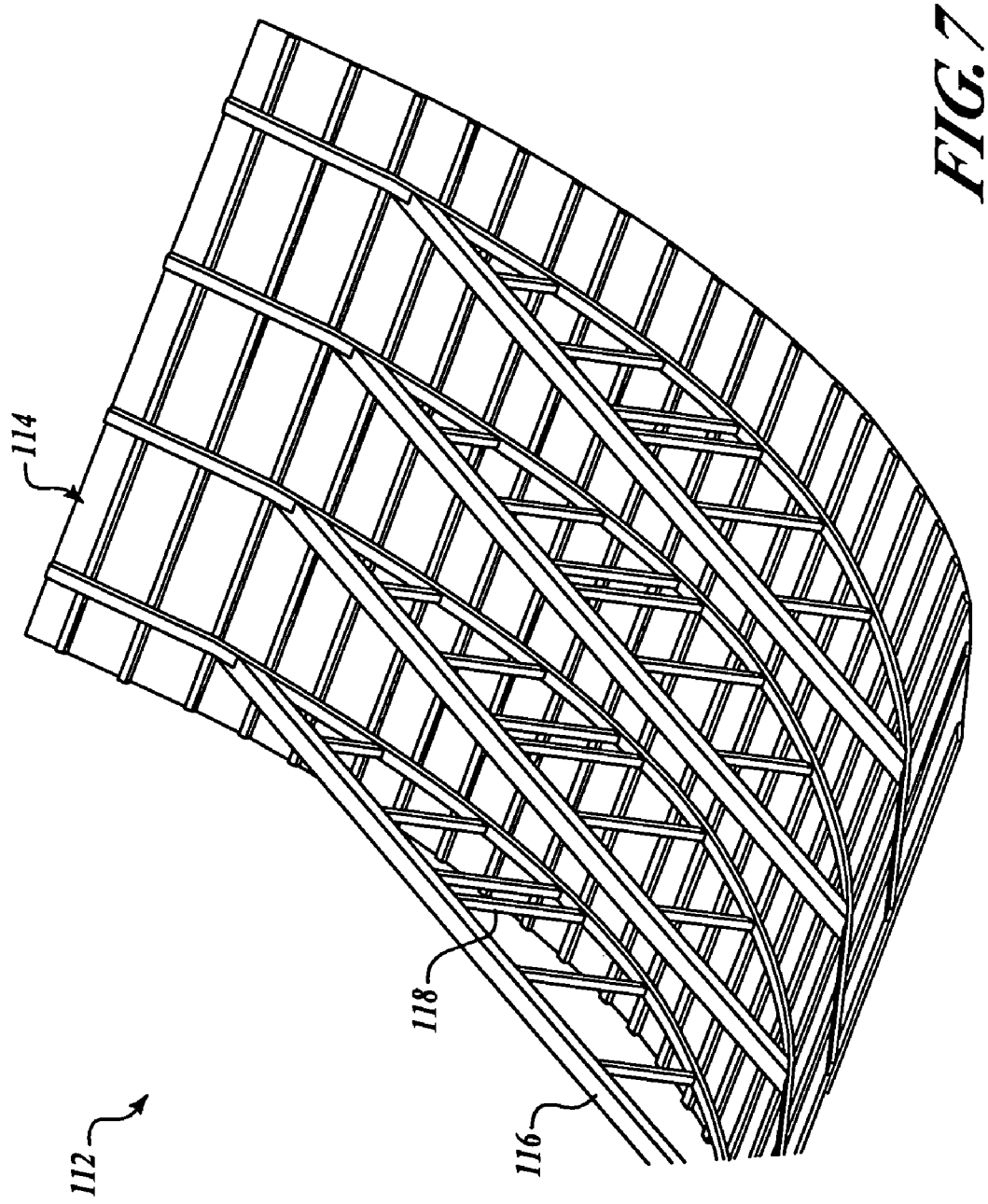
FIG. 7 is a perspective view of modeled primary aircraft structure.

Referring now to FIG. 7, modeled structure 112 includes fuselage skin panels 114, cargo compartment floor beams 116, and stanchions 118. Other modeled structure may include passenger floor beams, panels, carpeting, and seat tracks; cargo compartment panels and roller trays; and fuselage stringers and frames.

Referring back to FIG. 5, at a block 120 boundary conditions are input into the heat transfer model. The boundary conditions input into the heat transfer model at the block 120 include the air flows affecting the cargo compartment and the initial air and structure temperatures before initiation of the fire.

Figure 8:
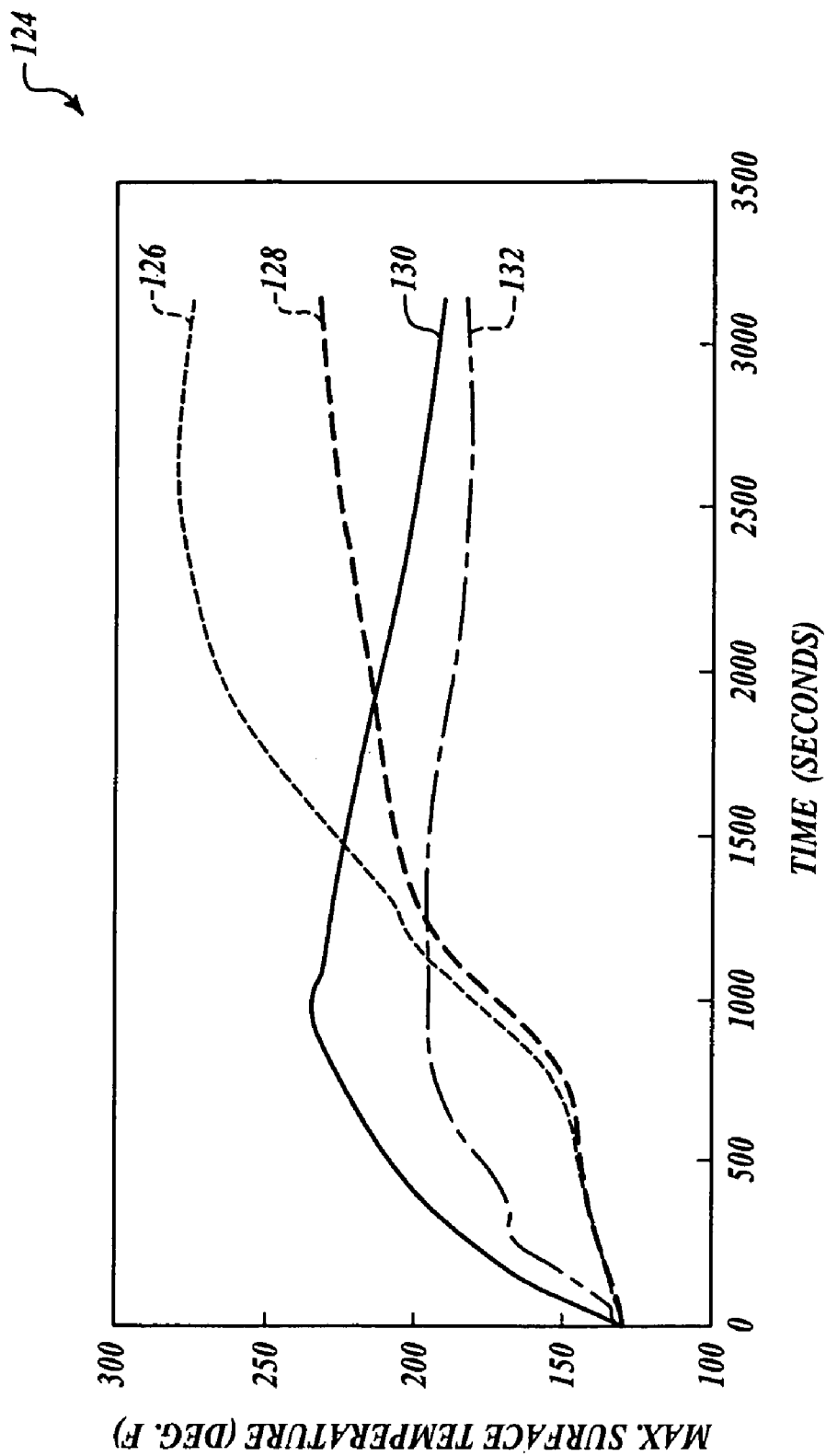
FIG. 8 is a graph of temperature versus time for modeled primary aircraft structure.

At a block 122 the heat transfer model is run. The heat transfer model predicts temperatures within the modeled structure over time. Referring now to FIG. 8 and given by way of non-limiting example, an exemplary graph 124 plots structure temperatures for a cargo floor and surrounding structure predicted by the heat transfer model versus time after initiation of a palletized cargo fire. A curve 126 plots predicted temperatures within a cargo floor beam at a location that is one foot away from the palletized cargo fire. A curve 128 plots predicted temperatures within a cargo floor beam at a location that is three feet away from the palletized cargo fire. A curve 130 plots predicted temperatures within a stringer, and a curve 132 plots predicted temperatures within a frame.

Figure 9A:
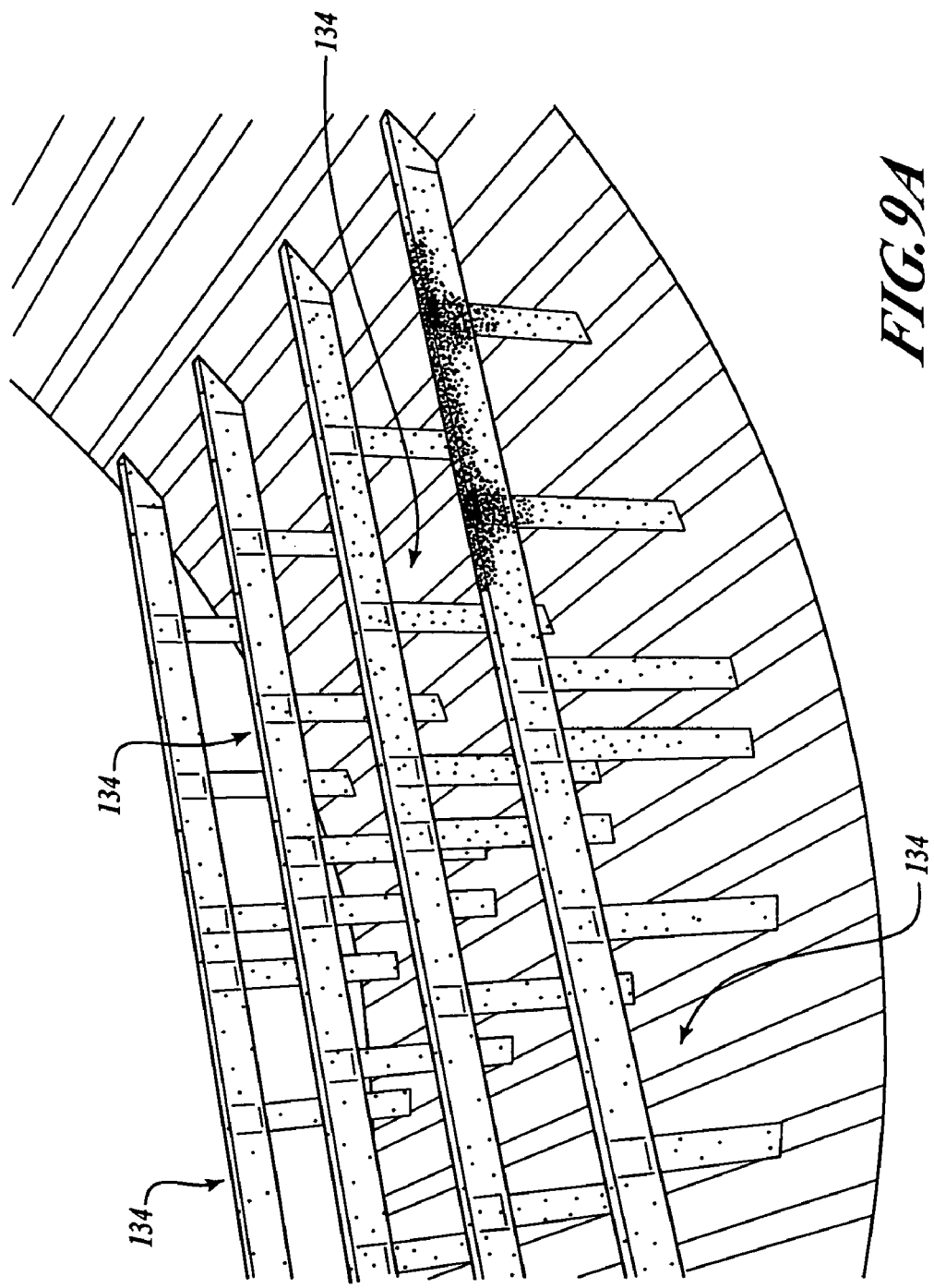
FIGS. 9A and 9B illustrate temperatures at various locations of modeled primary aircraft structure.
Figure 9B:
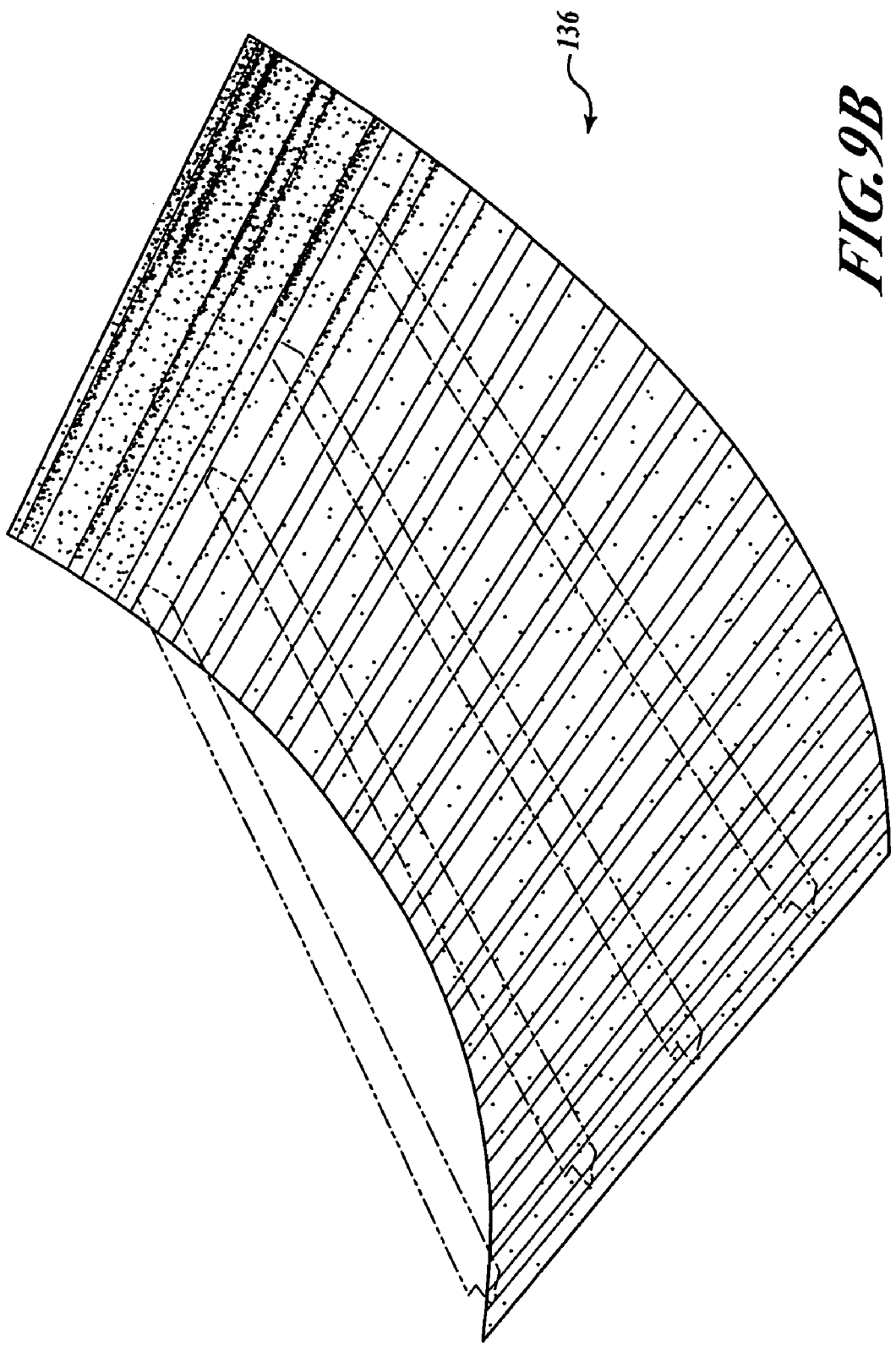

Other output presentations from the heat transfer model may be displayed as desired. For example, peak temperatures that are predicted within structure may be illustrated. Referring now to FIG. 9A and given by way of non-limiting example, peak temperatures that are predicted within cargo floor beams 134 for a palletized cargo fire are illustrated. The temperatures may be indicated as desired, such as for example with a color code, symbols, numbers, letters, or the like. Given by way of non-limiting example, as shown in FIG. 9A, density of symbols is proportional to temperature (that is, a higher density of symbols represents a higher temperature). As another non-limiting example and referring now to FIG. 9B, peak temperatures that are predicted within fuselage skin 136 for a palletized cargo fire are illustrated. Again, the temperatures may be indicated as desired, such as for example with a color code, symbols, numbers, letters, or the like. Given by way of non-limiting example, as shown in FIG. 9B, density of symbols is proportional to temperature (that is, a higher density of symbols represents a higher temperature).

Referring briefly back to FIG. 1, at a block 138 integrity of the modeled structure is analyzed for aircraft flight certification requirements for the available strength at the calculated temperatures. Exemplary aircraft flight certification requirements are met with an analysis that shows sufficient structural integrity is maintained to safely land the airplane for the temperatures occurring in the event of a controlled cargo fire.

Figure 10:
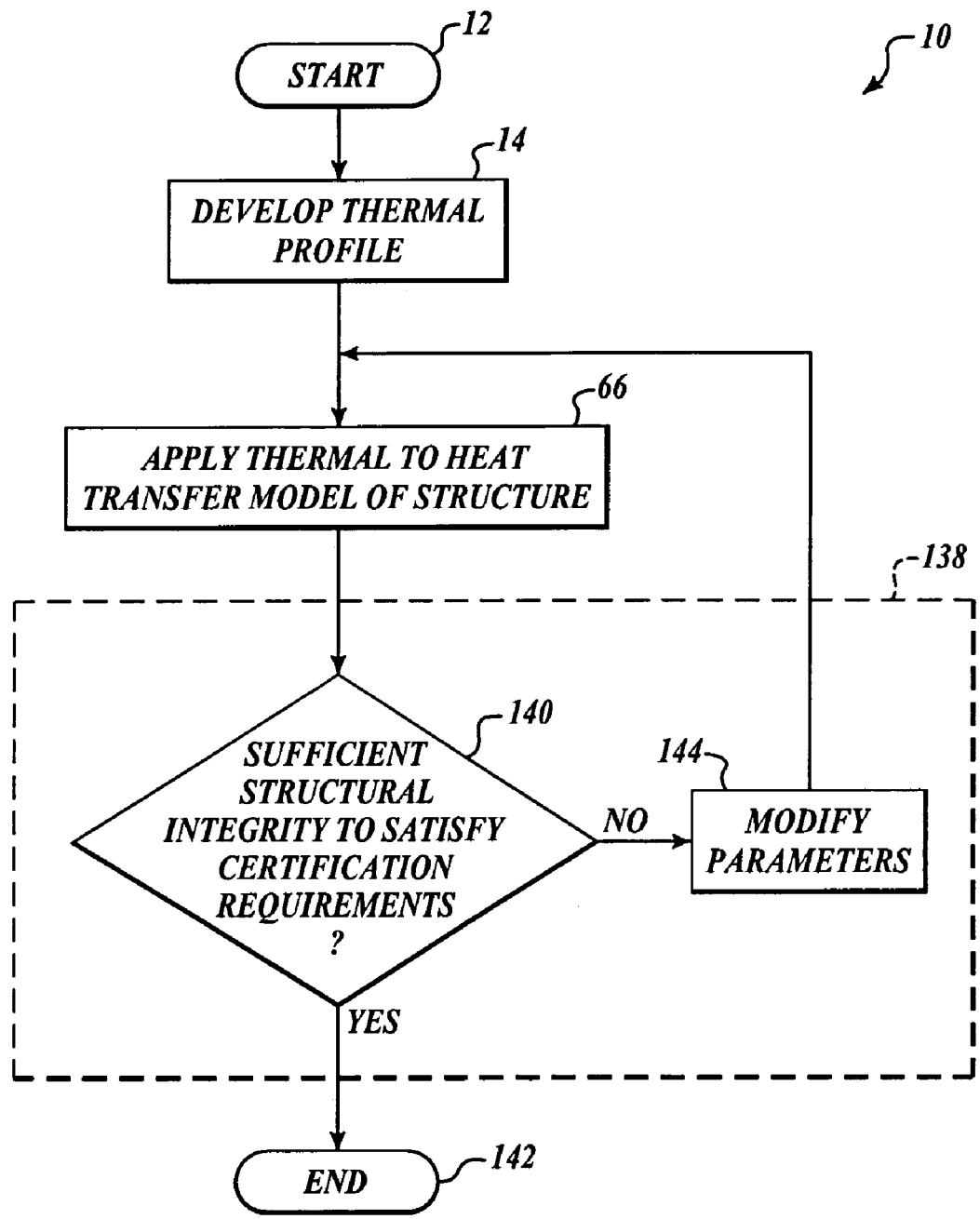
FIG. 10 is a flowchart of another exemplary method of analyzing effects of cargo fires on primary aircraft structure.

Referring now to FIG. 10, details of the block 138 will be explained. Processing at the blocks 12, 14, and 66 has already been explained above. At a decision block 140 a determination is made whether structural integrity of the modeled structure is sufficient for aircraft flight certification requirements. Structural temperatures calculated from the heat transfer model are used in the structural model to determine if adequate strength of the structure is maintained. That is, in an exemplary embodiment, a determination is made if calculated temperature for a structure is less than a predetermined temperature for the structure. If a determination is made that structural integrity of the modeled structure is sufficient for aircraft flight certification requirements (that is, calculated temperature for the structure is less than a predetermined temperature), then the method 10 (FIG. 1) ends at a block 142 (also FIG. 1).

If a determination is made that structural integrity of the modeled structure is insufficient for aircraft flight certification requirements (that is, calculated temperature for the structure is not less than a predetermined temperature), then at a block 144 structure parameters are modified. For example, a thermal protection system to reduce heat transfer from the cargo compartment to the adjacent structure may be added. For example, a thermal protection system could include an insulation blanket. After the parameter(s) is modified at the block 144, the method 10 returns to the block 66. A new heat transfer model is built using the modified parameters, the thermal profile is applied to the new heat transfer model, and the analysis at the block 138 is repeated.

Exemplary Host Embodiment

FIGS. 1-10 are flowcharts and illustrations of exemplary methods, processing, output displays according to non-limiting embodiments. It will be understood that each block of the flowchart and illustrations, and combinations of blocks in the flowchart and illustrations, can be implemented by computer program instructions or other means, such as operator interaction. Although computer program instructions are discussed herein below, for example, an exemplary apparatus according to a non-limiting embodiment can include other means, such as hardware or some combination of hardware and software, including one or more processors or controllers for performing the thermal profile development, boundary condition determination, thermal model generation and running, and structural analysis.

Figure 11:
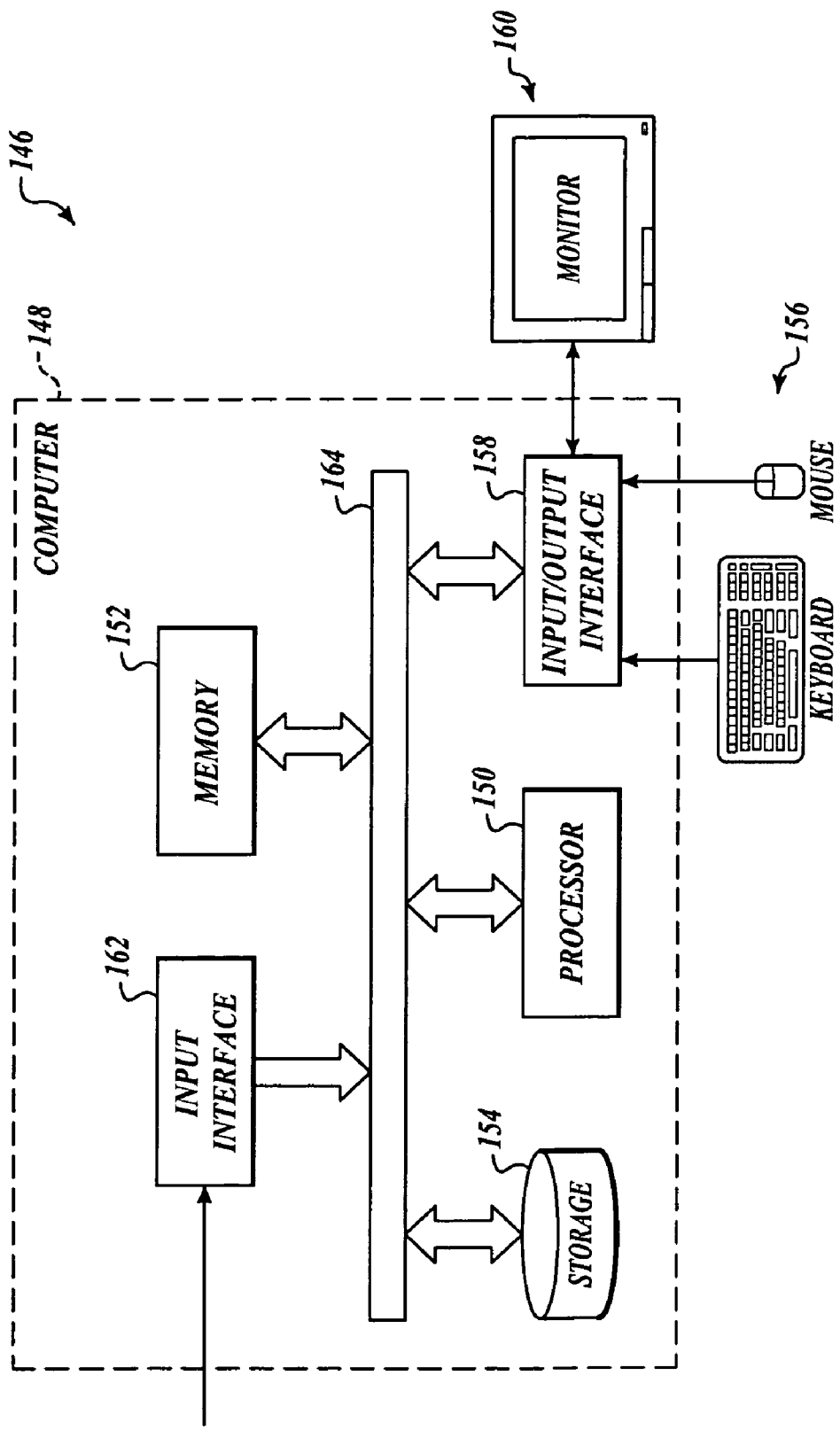
FIG. 11 is a block diagram of an exemplary system for analyzing effects of cargo fires on primary aircraft structure.

In this regard, FIG. 11 depicts a system 146 of one exemplary host embodiment including several of the key components of a general purpose computer 148 on which exemplary methods and processing discussed herein may be implemented. Those of ordinary skill in the art will appreciate that a computer includes many more components than those shown in FIG. 11. However, it is not necessary that all of these generally conventional components be shown in order to disclose an illustrative embodiment. The computer 148 includes a processing unit (or processor) 150 and a memory 152, which suitably includes random access memory (RAM) and read-only memory (ROM) of any acceptable variant. The computer 148 also includes storage 154, such as a hard disk drive or other disk drive such as an optical disk drive, where data, such as outputs from thermal sensors and thermal profiles and thermal models, as well as applications such as modeling programs, may be stored. The system 146 can also include one or more user interface devices 156, such as a mouse, keyboard, etc, that are connected to an input/output interface 158 that is included in the computer 148. A display 160 is provided for viewing data, processing and prompts from modeling programs, and temperature profiles predicted by modeling programs, and for permitting a user to interact with an input interface 162, such as an RS-232 interface or the like, to request and/or select output signals from thermal sensors. The display 160 is connected to the input/output interface 158. A system bus 164 interconnects the processor 150, the memory 152, the storage 154, the input/output interface 158, and the input interface 162.

Typically, computer program instructions may be loaded onto the computer 148 or other programmable apparatus to produce a machine, such that the instructions which execute on the computer or other programmable apparatus create means for implementing the functions specified in the flowcharts or screen shot block(s) or processing block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart or screen shot block(s) or processing block(s). The computer program instructions may also be loaded onto the computer 148 or other programmable apparatus to cause a series of operational steps to be performed on the computer 148 or other programmable apparatus to produce a computer implemented process such that the instructions which execute on the computer 148 or other programmable apparatus provide steps for implementing the functions specified in the flowchart or screen shot block(s) or processing block(s).

Accordingly, blocks of the flowchart or screen shot illustrations support combinations of means for performing the specified functions and program instruction means for performing the specified functions. It will also be understood that each block of the flowchart or screen shot illustrations, and combinations of blocks in the flowchart or screen shot illustrations, can be implemented by special purpose hardware-based computer systems which perform the specified functions or steps, or combinations of special purpose hardware and computer instructions.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method comprising:
   developing a thermal profile of a suppressed fire in a physical model of a cargo compartment of an aircraft, wherein the physical model is built to enable the measurement of temperatures generated during ignition and suppression of a controlled cargo fire, wherein the thermal profile of the suppressed fire includes one or more profiles of temperature versus time for a plurality of locations in the physical model of the cargo compartment;
   analyzing heat transfer resulting from applying the thermal profile of the suppressed fire to a structure of the aircraft surrounding the cargo compartment to determine a predicted temperature reached by one or more parts of the structure surrounding the cargo compartment as a result of the suppressed fire; and
   generating an output at a display or other output device of a computer system, the output including the predicted temperature reached by the one or more parts of the structure surrounding the cargo compartment to facilitate analyzing whether the one or more parts of the structure surrounding the cargo compartment have sufficient strength after reaching the predicted temperature to safely land the aircraft.

2. The method of claim 1, wherein developing the thermal profile includes determining boundary locations for the heat transfer resulting from applying the thermal profile to the structure of the aircraft surrounding the cargo compartment.

3. The method of claim 2, wherein determining the boundary locations for the heat transfer includes selecting a predetermined number of the profiles of temperature versus time based on fires having highest energy levels, wherein an energy level of each of the profiles of temperature versus time is determined by an area under a curve of each of the profiles of temperature versus time.

4. The method of claim 2, wherein analyzing the heat transfer further includes building a heat transfer model of the structure surrounding the cargo compartment.

5. The method of claim 4, wherein analyzing the heat transfer further includes inputting boundary conditions into the heat transfer model.

6. The method of claim 5, wherein the boundary conditions include predicted initial pre-fire air temperatures and surface temperatures in the cargo compartment and surface temperatures of the structure surrounding the cargo compartment.

7. The method of claim 5, wherein analyzing the heat transfer further includes executing the heat transfer model on a computing system and applying the heat transfer model to the thermal profile.

8. The method of claim 1, wherein analyzing whether the one or more parts of the structure surrounding the cargo compartment have sufficient strength after reaching the predicted temperature to safly land the aircraft includes determining whether the predicted temperature is less than a predetermined temperature for the structure surrounding the cargo compartment.

9. The method of claim 8, further comprising modifying structural parameters of the structure surrounding the cargo compartment when it is determined that the predicted temperature results in the structure surrounding the cargo compartment not meeting flight certification requirements for structural integrity.

10. The method of claim 1, wherein the physical model of the cargo compartment is loaded with predetermined cargo compartment loads.

11. The method of claim 1, wherein enabling the measurement of temperatures generated during ignition and suppression of the controlled cargo fire in the physical model of the cargo compartment includes instrumenting the plurality of locations in the physical model of the cargo compartment with a plurality of temperature sensors.

12. The method of claim 11, wherein the plurality of locations in the physical model of the cargo compartment includes two or more of a ceiling of the cargo compartment, sidewalls of the cargo compartment, endwalls of the cargo compartment, and floors of the cargo compartment.

13. The method of claim 11, wherein developing the thermal profile of the suppressed fire includes:

introducing a fire in the physical model of the cargo compartment; and suppressing the fire.

14. The method of claim 13, wherein the measurement of temperatures includes measuring, with the plurality of temperature sensors, air temperatures and surface temperatures in the physical model of the cargo compartment and of the structure surrounding the physical model of the cargo compartment.

15. The method of claim 14, wherein each of the one or more profiles of temperature versus time is determined from an output of one of the plurality of temperature sensors included in the thermal profile.

16. The method of claim 15, wherein the one or more profiles of temperature versus time include one or more profiles for air temperatures in the physical model of the cargo compartment.

17. The method of claim 15, wherein the one or more profiles of temperature versus time include one or more profiles for surface temperatures in the physical model of the cargo compartment.

18. The method of claim 1, wherein analyzing the heat transfer includes determining a heat transfer model of the structure surrounding the cargo compartment of the aircraft and generating the output utilizing the thermal profile of the suppressed fire.

19. The method of claim 1, wherein generating the output of the predicted temperature includes determining and providing surface temperatures of the structure surrounding the physical model of the cargo compartment.

20. The method of claim 3, wherein determining the predetermined number of the profiles of temperature versus time includes selecting the profiles of temperature versus time for the fires having the highest energy levels.

* * * * *